(12) United States Patent
Nishijima (10) Patent No.: US 10,045,002 B2
(45) Date of Patent: Aug. 7, 2018

(54) OBJECT RECOGNIZING APPARATUS AND STAIN DETECTING METHOD

(71) Applicant: TOYOTA JIDOSHA KABUSHIKI KAISHA, Toyota-shi, Aichi-ken (JP)

(72) Inventor: Masakazu Nishijima, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/242,716

(22) Filed: Aug. 22, 2016

(65) Prior Publication Data
US 2017/0076463 A1   Mar. 16, 2017

(30) Foreign Application Priority Data
Sep. 16, 2015   (JP) ................. 2015-183166

(51) Int. Cl.
| | |
|---|---|
| G06K 9/00 | (2006.01) |
| H04N 13/00 | (2018.01) |
| H04N 13/02 | (2006.01) |
| G06T 7/00 | (2017.01) |
| G06T 7/593 | (2017.01) |

(Continued)

(52) U.S. Cl.
CPC ..... *H04N 13/0011* (2013.01); *G06K 9/00791* (2013.01); *G06T 7/0002* (2013.01); *G06T 7/593* (2017.01); *H04N 13/0239* (2013.01); *H04N 13/0253* (2013.01); *B60S 1/04* (2013.01); *B60S 1/0844* (2013.01); *G06K 9/00825* (2013.01); *G06T 2207/10012* (2013.01); *G06T 2207/10028* (2013.01); *G06T 2207/30168* (2013.01); *G06T 2207/30252* (2013.01)

(58) Field of Classification Search
CPC ........................................... G06T 2207/30168
See application file for complete search history.

(56) References Cited

U.S. PATENT DOCUMENTS

| | | | |
|---|---|---|---|
| 2003/0069674 A1* | 4/2003 | Stam | B60Q 1/143 |
| | | | 701/36 |
| 2007/0115357 A1* | 5/2007 | Stein | B60Q 1/0023 |
| | | | 348/148 |

(Continued)

FOREIGN PATENT DOCUMENTS

| | | |
|---|---|---|
| DE | 102 54 684 A1 | 6/2004 |
| DE | 10 2009 041 544 A1 | 3/2011 |

(Continued)

*Primary Examiner* — Oneal R Mistry
(74) *Attorney, Agent, or Firm* — Sughrue Mion, PLLC (57) ABSTRACT

An object recognizing apparatus is mounted in a vehicle and uses photographed images of a stereo camera which photographs an exterior of a vehicle from a vehicle interior of the vehicle through an area of a window glass wiped by a wiper. The object recognizing apparatus is provided with: a light source detector configured to detect a light source on a photographed image; an edge detector configured to detect an edge extending in a direction crossing a wiping direction of the wiper, on the photographed image; and a determinator configured to determine that the window glass is stained, if the edge extending in the crossing direction from the light source is detected continuously for a predetermined time, on the basis of a detection result of the light source detector and a detection result of the edge detector.

5 Claims, 6 Drawing Sheets

(51) Int. Cl.
*B60S 1/04* (2006.01)
*B60S 1/08* (2006.01)

(56) References Cited

U.S. PATENT DOCUMENTS

| | | | |
|---|---|---|---|
| 2009/0128629 A1* | 5/2009 | Egbert | B60R 1/00 348/148 |
| 2014/0321701 A1* | 10/2014 | Halimeh | B60S 1/0844 382/103 |
| 2015/0298657 A1 | 10/2015 | Kanter et al. | |
| 2016/0297406 A1 | 10/2016 | Jansen et al. | |

FOREIGN PATENT DOCUMENTS

| | | |
|---|---|---|
| DE | 10 2012 210 116 A1 | 12/2012 |
| DE | 10 2012 222 126 A1 | 6/2014 |
| DE | 10 2013 225 972 A1 | 6/2015 |
| JP | 2008-148051 A | 6/2008 |
| JP | 2012-201178 A | 10/2012 |

* cited by examiner

FIG. 8B  Rotate by particular angle

FIG. 8C  Extract particular-direction edge

OBJECT RECOGNIZING APPARATUS AND STAIN DETECTING METHOD

CROSS-REFERENCE TO RELATED APPLICATIONS

This application is based upon and claims the benefit of priority of the prior Japanese Patent Application No. 2015-183166, filed on Sep. 16, 2015, the entire contents of which are incorporated herein by reference.

BACKGROUND OF THE INVENTION

1. Field of the Invention

Embodiments of the present invention relate to an object recognizing apparatus and a strain detecting method, which use photographed images of a stereo camera configured to photograph an exterior of a vehicle through a window glass from a vehicle interior of the vehicle, such as, for example, an automobile.

2. Description of the Related Art

On this type of apparatus, a distance to an object that exists ahead of the vehicle is calculated from parallax based on an image photographed by a left camera of a stereo camera and an image photographed by a right camera of the stereo camera. By the way, there is a possibility that the window glass is stained, and the stain on the window glass possibly reduces accuracy of the calculation of the distance.

For example, Japanese Patent Application Laid Open No. 2012-201178 describes an apparatus configured to determine that, if an unchanged area that does not change on a time series is detected on photographed images of a stereo camera during running of a self-vehicle, the unchanged area is an unwiped stain left by a wiper apparatus (i.e. a stain), and configured to determine that a wiping performance of a wiper blade is deteriorated.

In a technology described in Japanese Patent Application Laid Open No. 2012-201178, a stain on the window glass appears in the photographed images is only targeted, and a stain on the window glass that is not clearly reflected in the photographed images (e.g. irregular wiping of a wiper in rainy weather (i.e. a film of water), a file of oil, etc.) is not considered.

However, if there is the stain on the window glass that is not clearly reflected in the photographed images and if light sources (e.g. a headlight of an oncoming vehicle, a street light, etc.) are photographed by the stereo camera through the window glass, a striation (or a line of light) extending from the light sources, sometimes, appear in the photographed images. If the distance is calculated from parallax based on the photographed images in which the a striation appears, an erroneous result, such as a result indicating that the object exists in an originally empty space, is possibly outputted due to the a striation, which is technically problematic.

SUMMARY

In view of the aforementioned problems, it is therefore an object of embodiments of the present invention to provide an object recognizing apparatus and a stain detecting method in which a stain on a window glass, which causes a striation to be generated, can be detected.

The above object of embodiments of the present invention can be achieved by an object recognizing apparatus, which is mounted in a vehicle and which uses photographed images of a stereo camera, the stereo camera having two cameras, each of which photographs an exterior of a vehicle from a vehicle interior of the vehicle through an area of a window glass wiped by a wiper, said object recognizing apparatus is provided with: a light source detector configured to detect a light source on a photographed image photographed by at least one of the two cameras; an edge detector configured to detect an edge extending in a direction crossing a wiping direction of the wiper, on the photographed image photographed by at least one of the two cameras; and a determinator configured to determine that the window glass is stained, if the edge extending in the crossing direction from the light source is detected continuously for a predetermined time, on the basis of a detection result of the light source detector and a detection result of the edge detector.

In the area of the window glass wiped by the wiper, a stain extends in the wiping direction of the wiper in many cases. Thus, if the window glass is stained and if the light source located in the exterior of the vehicle is photographed by the stereo camera through the area of the window glass wiped by the wiper, a striation extending from the light source appears in the photographed image in the direction crossing the wiping direction of the wiper, wherein the details thereof will be described later. The striation in the photographed image is brighter than its surroundings and has a relatively large difference in pixel value (e.g. difference in luminance value) from that of the surroundings. Thus, if an edge detection process is performed on the photographed image, the striation is detected as an edge.

If the edge, which extends in the direction crossing the wiping direction of the wiper form the light source, is detected on the basis of the detection result of the light source detector and the detection result of the edge detector, the striation, which extends in the direction crossing the wiping direction of the wiper form the light source, highly likely appears in the photographed image. The determinator determines that the window glass is stained, if the edge, which extends in the direction crossing the wiping direction of the wiper from the light source, is detected continuously for the predetermined time.

As described above, the object recognizing apparatus according to embodiments of the present invention is configured to detect the stain on the window glass, not by detecting the stain itself on the window glass, but by detecting the striation, which is caused by the stain, as the edge. Therefore, according to the object recognizing apparatus according to embodiments of the present invention, it is possible to detect the stain on the window glass, which causes the generation of the striation, which hardly clearly appears in the photographed image.

In addition, it is possible to improve determination reliability because the determinator is configured to determine that the window glass is stained, if the edge extending in the direction crossing the wiping direction of the wiper from the light source is detected continuously for the predetermined time, as described above.

The above object of embodiments of the present invention can be achieved by a stain detecting method in an object recognizing apparatus, which is mounted in a vehicle and which uses photographed images of a stereo camera, the stereo camera having two cameras, each of which photographs an exterior of a vehicle from a vehicle interior of the vehicle through an area of a window glass wiped by a wiper, said object recognizing method including; detecting a light source on a photographed image photographed by at least one of the two cameras; detecting an edge extending in a direction crossing a wiping direction of the wiper, on the photographed image photographed by at least one of the two cameras; and determining that the window glass is stained, if the edge extending in the crossing direction from the light source is detected continuously for a predetermined time, on the basis of a detection result of the detecting a light source and a detection result of the detecting an edge.

In the stain detecting method according to embodiments of the present invention, as in the object recognizing apparatus according to embodiments of the present invention, it is possible to detect the stain on the window glass, which causes the generation of the striation, which hardly clearly appears in the photographed image, and it is also possible to improve the determination reliability in the determining.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

An object recognizing apparatus and a stain detecting method according to embodiments of the present invention will be explained with reference to the drawings.

First Embodiment

An object recognizing apparatus and a stain detecting method according to a first embodiment of the present invention will be explained with reference to FIG. 1 to FIG. 8D.

(Configuration of Object Recognizing Apparatus)

Figure 1:
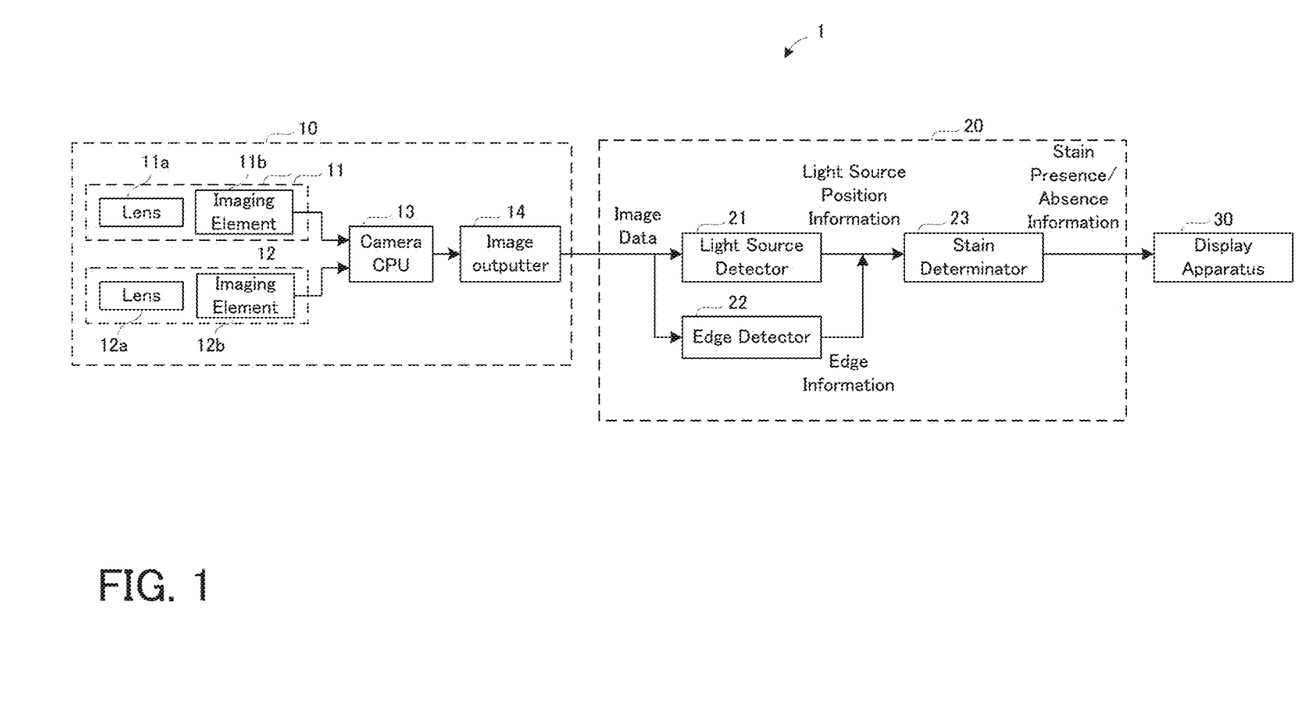
FIG. 1 is a block diagram illustrating a main part of an object recognizing apparatus according to a first embodiment.

A configuration of the object recognizing apparatus according to the first embodiment will be explained with reference to FIG. 1. FIG. 1 is a block diagram illustrating a main part of the object recognizing apparatus according to the first embodiment.

In FIG. 1, an object recognizing apparatus 1 is provided with a stereo camera 10, a stereo image recognizing apparatus 20, and a display apparatus 30.

The stereo camera 10 is provided with: a left camera 11 having a lens 11a and an imaging element 11b; a right camera 12 having a lens 12a and an imaging element 12b; a camera central processing unit (CPU) 13; and an image outputter 14.

The imaging elements 11b and 12b may include a charge couple device (CCD) or the like. The camera CPU 13 is configured to control exposure of each of the left camera 11 and the right camera 12, or the like. Moreover, the camera CPU 13 is configured to transmit photographed images imaged by the imaging elements 11b and 12b, as image signals, to the stereo image recognizing apparatus 20 via the image outputter 14, which is an output interface.

Figure 2:
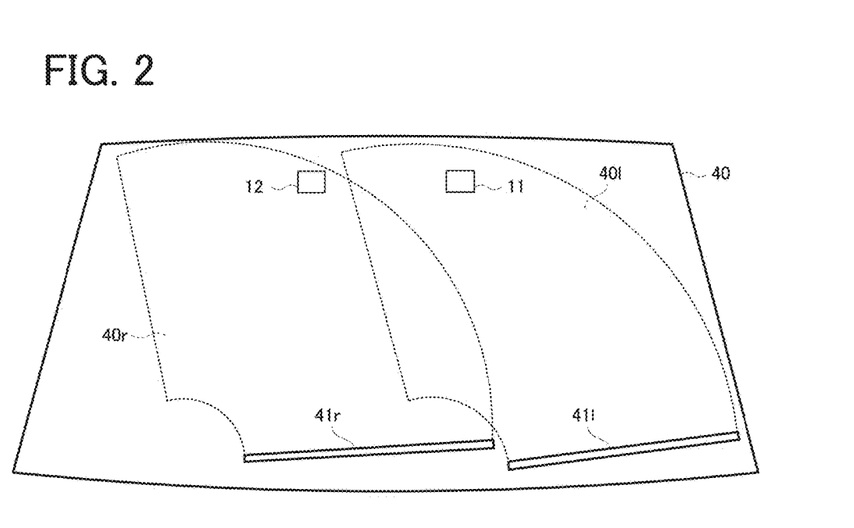
FIG. 2 is a diagram illustrating a positional relation between a wiper wiping area and a stereo camera when a windshield of a vehicle is seen from an exterior of the vehicle.

Here, the left camera 11 and the right camera 12, which constitute the stereo camera 10, are arranged in a wiper wiping area on a windshield 40 of a vehicle, as illustrated in FIG. 2. FIG. 2 is a diagram illustrating a positional relation between the wiper wiping area and the stereo camera when the windshield of the vehicle is seen from an exterior of the vehicle. The "windshield 40" of the embodiment is one example of the "window glass" of the present invention.

Specifically explaining it, if a not-illustrated wiper switch is turned on by an operator, a not-illustrated wiper arm is swung along the windshield 40. As a result, a left wiper blade 41l wipes a wiping area 40l, which is a left side of the windshield 40, and a right wiper blade 41r wipes a wiping area 40r, which is a right side of the windshield 40. In the wiper wiping area, the left camera 11 is placed at a position opposite to an upper part of the wiping area 40l, which is the left side. The right camera 12 is placed at a position opposite to an upper part of the wiping area 40r, which is the right side.

Therefore, each of the left camera 11 and the right camera 12 photographs the exterior of the vehicle through the wiper wiping area of the windshield 40 from an interior of the vehicle. Each of the left camera 11 and the right camera 12 photographs the exterior of the vehicle continuously at predetermined time intervals, by which a plurality of photographed images photographed on a time series are generated (refer to FIG. 3).

Back in FIG. 1 again, the stereo image recognizing apparatus 20 is provided with a light source detector 21, an edge detector 22, and a stain determinator 23. The light source detector 21, the edge detector 22, and the stain determinator 23 are functions realized by that a not-illustrated CPU provided for the stereo image recognizing apparatus 20 executes a computer program stored in a not-illustrated read only memory (ROM). The functions of the stereo image recognizing apparatus 20 illustrated in FIG. 1 are functions for performing stain detection described later. The stereo image recognizing apparatus 20 also has a function(s) for performing object recognition or similar functions, which are not illustrated here.

(Influence of Stain on Windshield)

Figure 4:
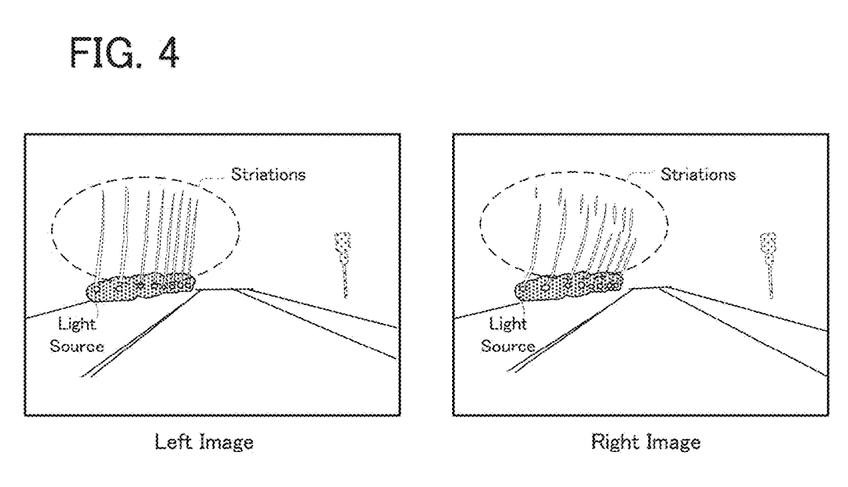
FIG. 4 is a diagram schematically illustrating one example of images photographed by the stereo camera.
Figure 5:
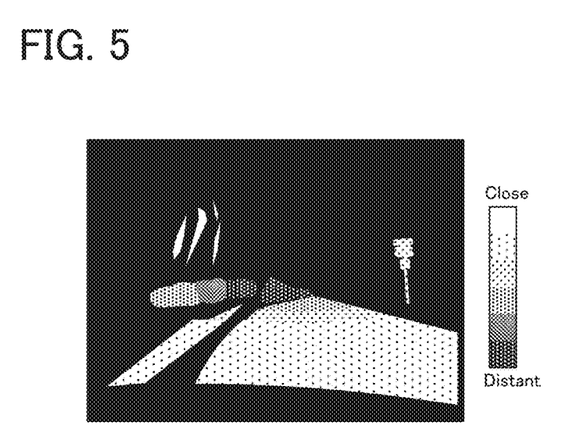
FIG. 5 is a diagram schematically illustrating one example of a parallax image based on the photographed images illustrated in FIG. 4.

Next, an image recognition process on the object recognizing apparatus 1 as configured above will be explained, and an influence on the image recognition process by the stain on the windshield 40 will be explained with reference to FIG. 4 and FIG. 5. FIG. 4 is a diagram schematically illustrating one example of images photographed by the stereo camera. FIG. 5 is a diagram schematically illustrating one example of a parallax image based on the photographed images illustrated in FIG. 4. In FIG. 4, in order to avoid a complicated drawing, only one position is described as the "light source", but a plurality of light sources appear in the photographed images.

When performing the image recognition process based on the photographed images of the stereo camera 10, the object recognizing apparatus 1 uses predetermined calibration data to firstly remove, from the photographed images, an influence of hardware internal error factors (e.g. lens distortion, optical axis deviation, focal distance deviation, imaging element distortion, etc.) caused by the lenses 11a and 11b, the imaging elements 12a and 12b, or the like, and then perform an existing geometric transformation process, such as matching an epipolar line with an image horizontal line.

The object recognizing apparatus 1 is configured to perform the image recognition process on the basis of image data on which the geometric transformation process is performed. The image recognition process may include an object recognition process based on a parallax image (or parallax information) and an object recognition process performed by pattern matching.

The object recognition process based on the parallax image is, for example, obtaining a correlation between a pair of images respectively photographed by the left camera 11 and the right camera 12 (e.g. an i-th left image and a j-th right image in FIG. 3) and calculating a distance to an object in a manner of triangulation on the basis of the parallax for the same object. Specifically, the distance to the object is calculated by extracting a part in which the object appears, from both the pair of images, and by obtaining a shift amount (or the parallax) in a corresponding point of the extracted part between the pair of images.

On the other hand, the object recognition process performed by the pattern matching may be performed, for example, by using an image photographed by one of the left camera 11 and the right camera 12. To the pattern matching, an existing method can be applied. Specifically, for example, methods that may use vector correlation, geometric matching, and a normalized correlation method, residual matching, or the like, which use a master pattern, can be applied to the pattern matching.

By the way, if there is an unwiped stain (i.e. a stain) left by a wiper on the windshield 40 of the vehicle, in some cases, a striation extending from a light source appears in photographed images when relatively strong light enters the stereo camera 10 through the windshield 40.

If the striation extending from the light source appears in the photographed images, a slope (or a generating direction) of the striation appearing in the photographed images varies between a left image photographed by the left camera 11 and a right image photographed by the right camera 12, as illustrated in FIG. 4. (The generating direction of the striation will be described later.)

On the basis of the photographed images illustrated in FIG. 4, the parallax image illustrated in FIG. 5 is obtained. On the parallax image, there is an area indicating parallax in a close range, in a partial area corresponding to areas in which striations appear in the photographed images illustrated in FIG. 4. A distance calculated from the parallax between the striations in the left image and the striations in the right image in this manner may be significantly different from the actual distance between the light source and the stereo camera 10 in some cases. If the object recognition process is performed on the basis of the parallax image, it is erroneously recognized that some object exists in an originally empty space. Then, it possibly causes, for example, an unnecessary operation of a collision damage reducing brake system, which uses a result of the image recognition process by the object recognizing apparatus 1.

(Generating Direction of Striation)

Figure 6:
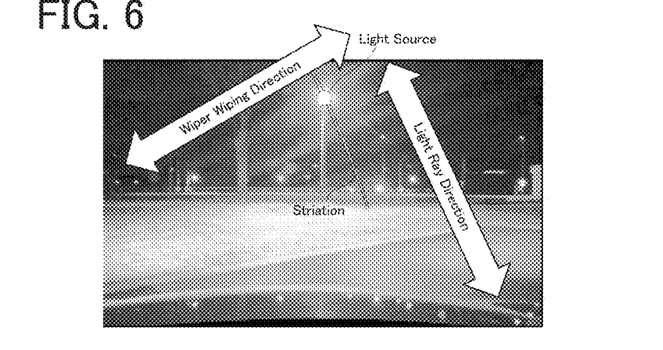
FIG. 6 is a diagram illustrating a relation between a wiping direction of a wiper and a striation extending from a light source.

Now, the striation will be explained with reference to FIG. 6. FIG. 6 is a diagram illustrating a relation between a wiping direction of a wiper and a striation extending from a light source.

It is known that if there is a stain (or scratch) extending in one direction on a surface of a transparent member, such as glass, and if a light source is photographed through the transparent member, a striation extending from the light source in a direction crossing the one direction appears in photographed images. This is considered to be due to a light diffraction phenomenon.

In the case of the windshield 40 of the vehicle, the stain is often wiped by the wiper blades 41l and 41r and thus often extends in the wiping direction of the wiper. Thus, if the light source is photographed through the windshield 40 when the windshield 40 is stained, the striation extending from the light source appears in a photographed image in a direction crossing the wiping direction of the wiper (refer to FIG. 6).

In FIG. 6, the windshield 40 is intentionally stained in order to make the wiping direction of the wiper clear (i.e. in order to reflect the stain in the photographed image). It has been found by the present inventor, however, that the striation extends in the direction crossing the wiping direction of the wiper, regardless of the extent of the stain, as long as the windshield 40 is stained.

The present inventor has focused on the generating direction of the striation and has invented a method of detecting a stain on the windshield 40.

The "direction crossing the wiping direction of the wiper" is not limited to a direction perpendicular to the wiping direction of the wiper, but conceptually includes a direction that can be regarded as practically crossing the wiping direction of the wiper, even though it more or less deviates from the direction perpendicular to the wiping direction of the wiper.

(Stain Detecting Method)

Figure 7:
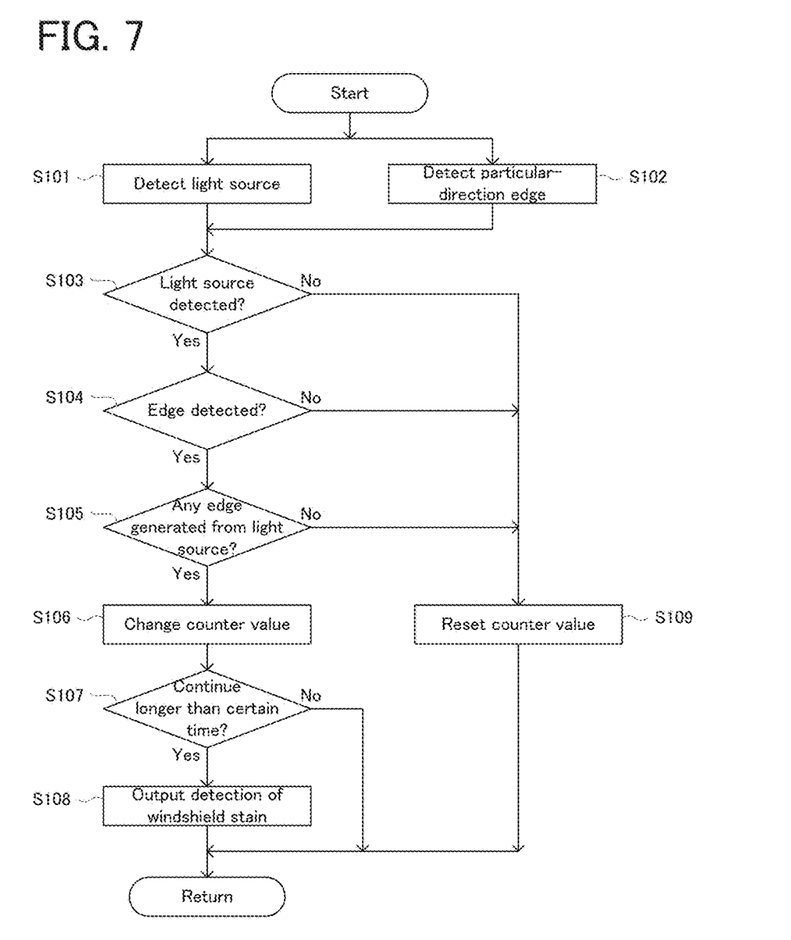
FIG. 7 is a flowchart illustrating a stain detecting process according to the first embodiment.

Next, a stain detecting method on the object recognizing apparatus 1 as configured above will be explained with reference to FIG. 7 and FIG. 8A to FIG. 8D. FIG. 7 is a flowchart illustrating a stain detecting process according to the first embodiment. FIG. 8A to FIG. 8D are diagrams explaining an edge detecting method according to the first embodiment. A routine of the stain detecting process illustrated in FIG. 7 is repeatedly performed every predetermined period while an ignition switch of the vehicle is on.

In the flowchart in FIG. 7, firstly, the stereo image recognizing apparatus 20 of the object recognizing apparatus 1 detects the light source (step S101). In the first embodiment, the light source detection and edge detection described later are performed on the image photographed by one of the left camera 11 and the right camera 12 of the stereo camera 10. Here, it is assumed that the light source detection is performed on the left image photographed by the left camera 11.

Specifically, the light source detector 21 of the stereo image recognizing apparatus 20 extracts an area in which high luminance pixels (e.g. pixels with a luminance value of 255) are connected, as a light source area from the left image. The light source detector 21 outputs information indicating a position, a size, or the like of the extracted light source area on the image, as light source position information. If the light source area is not detected, the light source position information is empty data.

In parallel with the aforementioned step S101, the stereo image recognizing apparatus 20 performs the edge detection (step S102). The striation in the photographed image is brighter than its surroundings and has a relatively large difference in pixel value (e.g. difference in luminance value) from that of the surroundings, and is thus detected as an edge.

Figure 8A:
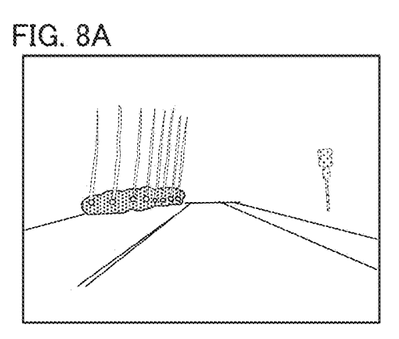
FIG. 8A to FIG. 8D are diagrams explaining an edge detecting method according to the first embodiment.
Figure 8B:
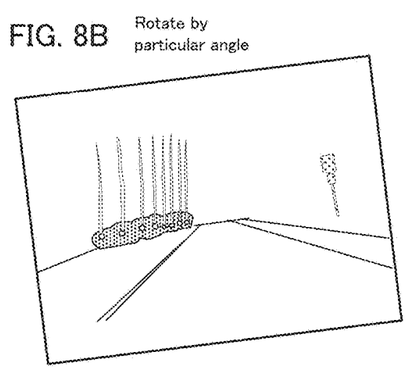
Figure 8C:
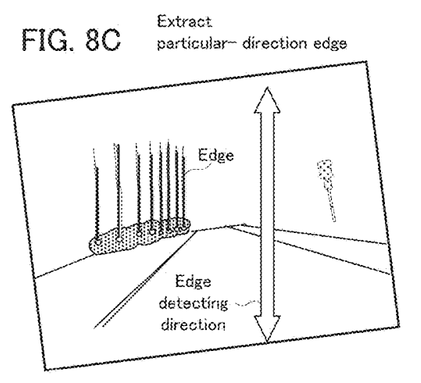
Figure 8D:
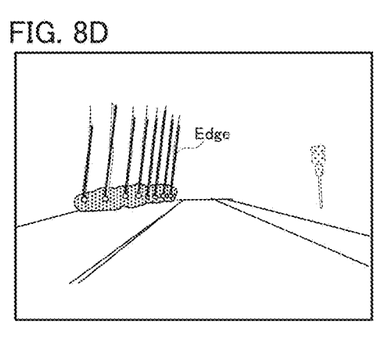

Specifically, the edge detector 22 of the stereo image recognizing apparatus 20 rotates the left image illustrated in FIG. 8A, which is a processing target, by a particular angle set in advance, as illustrated in FIG. 8B. Then, the edge detector 22 applies a longitudinal sobel filter to the left image rotated by the particular angle, thereby detecting an edge in an edge detecting direction (refer to FIG. 8C). Then, the edge detector 22 rotates the left image to its original position (refer to FIG. 8D).

Here, the "particular angle" is determined on the basis of the wiping direction of the wiper. Specifically, the wiping direction of the wiper is obtained on the basis of information regarding a mounting position of the stereo camera 10 (which may be obtained from, for example, vehicle design drawings, stereo camera installation drawings, or the like) and information regarding the operation of the wiper (which may be obtained from, for example, vehicle design drawings, stereo camera installation drawings, or the like). In the images illustrated in FIG. 8A to FIG. 8D, a direction from upper left to lower right is the wiping direction of the wiper.

As described in the above section "Generating Direction of Striation", the direction of the striation extending from the light source is the direction crossing the wiping direction of the wiper. Therefore, the "particular angle" is determined to be an angle in which the direction crossing the wiping direction of the wiper obtained is the edge detecting direction.

The edge detected by the edge detection described above is an edge extending in the direction crossing the wiping direction of the wiper, and highly likely indicates the striation caused by the stain on the windshield 40.

The wiper wiping area is arc-shaped, as illustrated in FIG. 2. The wiping direction of the wiper, however, can be considered to be a straight line in respective ranges appearing in the imaging elements 11b and 12b. Moreover, as illustrated in FIG. 2, the left camera 11 and the right camera 12 have different arrangement positions from each other. Thus, the wiping direction of the wiper in the left camera 11 is different from the wiping direction of the wiper in the right camera 12. As a result, the particular angle in the left image photographed by the left camera 11 is different from the particular angle in the right angle photographed by the right camera 12.

The edge detector 22 is configured to output information indicating a start point and an end point of the detected edge on the image, as edge information. If the edge is not detected, the edge information is empty data.

Then, the stain determinator 23 of the stereo image recognizing apparatus 20 determines whether or not the light source is detected on the light source position information (step S103). If it is determined that the light source is not detected (the step S103: No), the object recognizing apparatus 1 resets a value of a counter, which is used for stain determination described later (step S109) and temporarily ends the process. After a predetermined waiting time, the object recognizing apparatus 1 performs a stain detection process on a left image (e.g. an (i+1)-th left image in FIG. 3) next to the target left image for the current stain detection process (e.g. an i-th left image in FIG. 3) on a time series.

If it is determined that the light source is detected (the step S103: Yes), the stain determinator 23 determines whether or not the edge is detected on the basis of the edge information (step S104). If it is determined that the edge is not detected (the step S104: No), the object recognizing apparatus 1 resets the value of the counter, which is used for the stain determination described later (the step S109) and temporarily ends the process. After a predetermined waiting time, the object recognizing apparatus 1 performs the stain detection process on the left image (e.g. the (i+1)-th left image in FIG. 3) next to the target left image for the current stain detection process (e.g. the i-th left image in FIG. 3) on a time series.

If it is determined that the edge is detected (the step S104: Yes), the stain determinator 23 determines whether or not there is the edge extending from the light source indicated by the light source position information (i.e. the striation), in the edge indicated by edge detection information, on the basis of the light source position information and the edge detection information (step S105).

Here, whether or not there is the "edge extending from the light source" may be determined, for example, by determining whether or not the edge indicated by the edge detection information, or an extension line of the same, passes through the light source (or the light source area) indicated by the light source position information. If a plurality of edges are detected and if at least one of the plurality of edges indicated by the edge detection information passes through the light source (or the light source area) indicated by the light source position information, then, it is determined that there is the edge extending from the light source.

If it is determined that there is no edge extending from the light source (the step S105: No), the object recognizing apparatus 1 resets the value of the counter, which is used for the stain determination described later (the step S109) and temporarily ends the process. After a predetermined waiting time, the object recognizing apparatus 1 performs the stain detection process on the left image (e.g. the (i+1)-th left image in FIG. 3) next to the target left image for the current stain detection process (e.g. the i-th left image in FIG. 3) on a time series.

On the other hand, if it is determined that there is the edge extending from the light source (the step S105: Yes), the stain determinator 23 changes the value of the counter (step S106). For example, the value of the counter may be increased by one, or may be reduced by one (i.e. may be incremented or may be decremented) if it is determined that there is the edge extending from the light source.

Then, the stain determinator 23 determines whether or not the edge extending from the light source is detected continuously longer than a certain time (step S107). Specifically, if it is determined that there is the edge extending from the light source and if the value of the counter is incremented, the stain determinator 23 determines that the edge extending from the light source is detected continuously for a certain time if the present value of the counter is greater than or equal to a value of the counter obtained when it is determined that there is the edge extending from the light source regarding all the plurality of photographed images that are continuous on a time series corresponding to the certain time (e.g. 10 seconds).

Alternatively, if it is determined that there is the edge extending from the light source and if the value of the counter is decremented, the stain determinator 23 determines that the edge extending from the light source is detected continuously for a certain time if the present value of the counter is greater than or equal to zero. If the value of the counter is decremented, an initial value of the counter may be set to an absolute value of the value of the counter that is reduced when it is determined that there is the edge extending from the light source regarding all the plurality of photographed images that are continuous on a time series corresponding to the certain time.

In the process in the step S107, it is not necessary that the same edge is detected continuously longer than a certain time. As long as the edge extending from the light source is detected continuously longer than a certain time, regardless of whether or not the edge is the same, then, it is determined that the edge is detected continuously longer than the certain time.

If it is determined that the edge is not detected continuously longer than the certain time (the step S107: No), the object recognizing apparatus 1 temporarily ends the process. After a predetermined waiting time, the object recognizing apparatus 1 performs the stain detection process on the left image (e.g. the (i+1)-th left image in FIG. 3) next to the target left image for the current stain detection process (e.g. the i-th left image in FIG. 3) on a time series.

On the other hand, if it is determined that the edge extending from the light source is detected continuously longer than the certain time (the step S107: No), the stain determinator 23 outputs information indicating that the windshield 40 is stained, as stain presence/absence information. The display apparatus 30, which receives the stain presence/absence information indicating that the windshield 40 is stained, is configured to inform a driver of the vehicle that the windshield 40 is stained, by displaying characters or graphics, or by lighting a predetermined marker.

Then, the object recognizing apparatus 1 temporarily ends the process. After a predetermined waiting time, the object recognizing apparatus 1 performs the stain detection process on the left image (e.g. the (i+1)-th left image in FIG. 3) next to the target left image for the current stain detection process (e.g. the i-th left image in FIG. 3) on a time series.

The "certain time" according to the embodiment is a value for determining whether or not the windshield 40 is stained, and is typically determined as a fixed time. It may be determined, however, as a variable value according to some physical quantity or parameter. The "certain time" as described above may be set as a time corresponding to the number of times of detection in which the probability of erroneous determination is within an allowable range, for example, on the basis of a relation between the probability of the erroneous determination and the number of times of detection in which the edge extending from the light source is continuously detected, wherein the relation is obtained by experiences, experiments, or simulations. The "certain time" according to the embodiment is one example of the "predetermined time" according to embodiments of the present invention.

The object recognizing apparatus 1 may be configured to stop or hold the aforementioned image recognition process, or to automatically wash the windshield 40 by using a washer liquid and the wiper, as well as informing the driver of the vehicle that the windshield 40 is stained, if it is determined that the windshield 40 is stained. By virtue of such a configuration, the image recognition process is performed on the basis of the photographed image in which the striation appears, which makes it possible to prevent an erroneous result, such as a result indicating the object exists in an originally empty space, from being outputted.

The "light source detector 21", the "edge detector 22", and the "stain determinator 23" according to the embodiment are respectively one example of the "light source detector", the "edge detector", and the "determinator" according to embodiments of the present invention. The "light source position information" and the "edge information" of the embodiment are respectively one example of the "detection result of the light source detector" and the "detection result of the edge detector" of the present invention.

(Effect of the Invention)

In the stain detecting method in the object recognizing apparatus 1 according to the embodiment, as described above, it is determined whether or not the windshield 40 is stained, by detecting as the edge the striation extending in the wiping direction of the wiper from the light source. In other words, in the embodiment, it is possible to detect the stain on the windshield 40, which causes the striation to be generated, regardless of whether or not the stain itself on the windshield 40 appears in the photographed images.

In particular, at night when the driver hardly visually recognizes the surroundings, there are many light sources, such as, for example, a headlight of an oncoming vehicle and a street light, and a striation highly likely appears in the photographed images if the windshield 40 is stained. Of course, even in the daytime, depending on environments around the vehicle, the striations possibly appear in the photographed images if the windshield 40 is stained. At this time, the driver may feel uneasy if an erroneous result of the image recognition process is obtained due to the striations appear in the photographed images and if the erroneous result causes an unnecessary operation of a driving support system, such as, for example, a collision damage reducing brake system.

If the object recognizing apparatus according to the embodiment is configured, for example, to stop or hold the image recognition process when it is determined that the windshield 40 is stained, it is possible to avoid the unnecessary operation of the driving support system, which is extremely useful in practice.

Regardless of the arrangement of the stereo camera 10 illustrated in FIG. 2, for example, both the left camera 11 and the right camera 12 of the stereo camera 10 may be arranged opposite to each other in only one of the left-side wiping area 40*l* and the right-side wiping area 40*r*.

The process in the step S104 of the flowchart illustrated in FIG. 7 may be performed before or in parallel with the process in the step S103. Not only the method of the light source detection and the method of the edge detection described above, but also the other various existing methods can be also applied.

Second Embodiment

An object recognizing apparatus and a stain detecting method according to a second embodiment of the present invention will be explained with reference to FIG. 9. In the aforementioned embodiment, the stain detection process is performed on the image photographed by one of the left camera 11 and the right camera 12 of the stereo camera 10. In the second embodiment, however, the stain detection process is performed on both the images photographed by the left camera 11 and the right camera 12. The other configuration is the same as that in the first embodiment described above. Therefore, in the second embodiment, the same explanation as that in the first embodiment will be omitted, and the same parts on the drawing will carry the same reference numerals. Basically, only a different point will be explained with reference to FIG. 9.

(Stain Detecting Method)

The stain detecting method in the object recognizing apparatus 1 according to the second embodiment will be explained with reference to a flowchart in FIG. 9.

Figure 9:
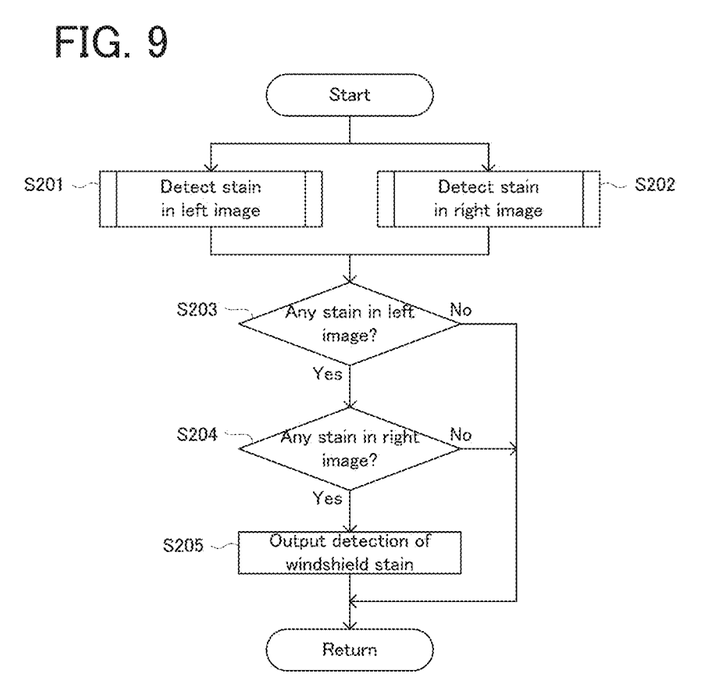
FIG. 9 is a flowchart illustrating a stain detecting process according to a second embodiment.

In FIG. 9, the stereo image recognizing apparatus 20 of the object recognizing apparatus 1 performs the stain detection on the left image photographed by the left camera 11 of the stereo camera 10 (step S201). Specifically, the stereo image recognizing apparatus 20 performs the processes in the steps S101 to S107 and S109 in the flowchart illustrated in FIG. 7, on the left image.

In parallel with the process in the step S201, the stereo image recognizing apparatus 20 performs the stain detection on the right image photographed by the right camera 12 of the stereo camera 10 (step S202). Specifically, the stereo image recognizing apparatus 20 performs the processes in the steps S101 to S107 and S109 in the flowchart illustrated in FIG. 7, on the right image.

Figure 3:
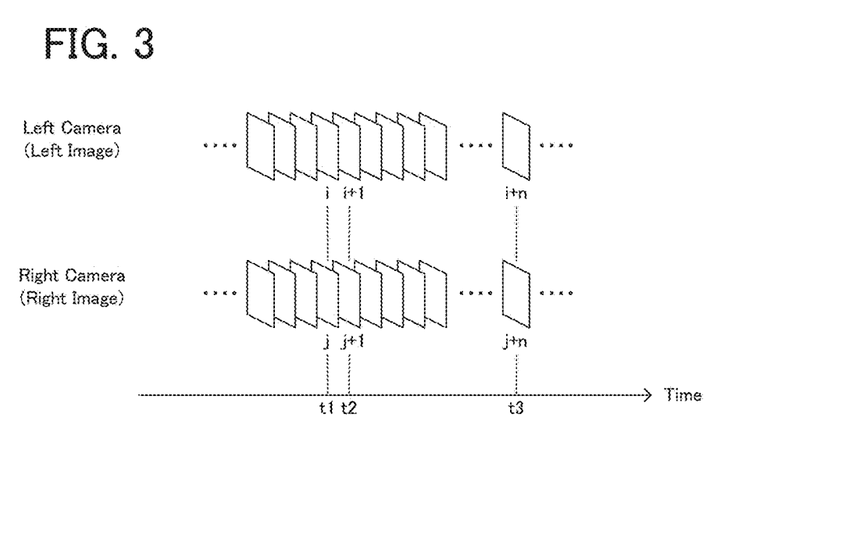
FIG. 3 is a conceptual diagram illustrating a plurality of images, which are photographed by a stereo camera and which are continuous on a time series.

Here, for example, if the stain detection is performed on the i-th left image illustrated in FIG. 3 in the process in the step S201, the stain detection is performed on the j-th right image, which is photographed at the same time as the left image, in the process in the step S202. After a result of repeated execution of the stain detection process according to the embodiment, for example, if the stain detection is performed on the i-th to (i+n)-th left images illustrated in FIG. 3, the stain detection is also performed on the j-th to (j+n)-th right images, which are respectively photographed at the same time as the i-th to (i+n)-th left images.

Then, the stain determinator 23 of the stereo image recognizing apparatus 20 determines whether or not the windshield 40 is stained on the basis of a result of the process in the step S201 (step S203). Specifically, the stain determinator 23 determines that the windshield 40 is stained if it is determined, regarding the left image, that the edge extending from the light source is detected continuously for the certain time, in the process in the step S107 of the flowchart illustrated in FIG. 7.

If it is determined that the windshield 40 is not stained (the step S203: No), the object recognizing apparatus 1 temporarily ends the process. After a predetermined waiting time, the object recognizing apparatus 1 performs the stain detection process on the left image and the right image (e.g. the (i+1)-th left image and the (j+1)-th right image in FIG. 3) next to the target left image and the target right image for the current stain detection process (e.g. the i-th left image and the j-th right image in FIG. 3) on a time series.

On the other hand, if it is determined that the windshield 40 is stained (the step S203: Yes), the stain determinator 23 determines whether or not the windshield 40 is stained on the basis of a result of the process in the step S202 (step S204). Specifically, the stain determinator 23 determines that the windshield 40 is stained if it is determined, regarding the right image, that the edge extending from the light source is detected continuously for the certain time, in the process in the step S107 of the flowchart illustrated in FIG. 7.

If it is determined that the windshield 40 is not stained (the step S204: No), the object recognizing apparatus 1 temporarily ends the process. After a predetermined waiting time, the object recognizing apparatus 1 performs the stain detection process on the left image and the right image (e.g. the (i+1)-th left image and the (j+1)-th right image in FIG. 3) next to the target left image and the target right image for the current stain detection process (e.g. the i-th left image and the j-th right image in FIG. 3) on a time series.

On the other hand, if it is determined that the windshield 40 is stained (the step S204: Yes), the stain determinator 23 outputs information indicating that stain determinator 23, as the stain presence/absence information. The display apparatus 30, which receives the stain presence/absence information indicating that the windshield 40 is stained, is configured to inform the driver of the vehicle that the windshield 40 is stained, by displaying characters or graphics, or by lighting a predetermined marker.

Then, the object recognizing apparatus 1 temporarily ends the process. After a predetermined waiting time, the object recognizing apparatus 1 performs the stain detection process on the left image and the right image (e.g. the (i+1)-th left image and the (j+1)-th right image in FIG. 3) next to the target left image and the target right image for the current stain detection process (e.g. the i-th left image and the j-th right image in FIG. 3) on a time series.

By virtue of such a configuration, it is possible to improve determination accuracy, in comparison with a case where the stain on the windshield 40 is detected by using only the image photographed by one of the left camera 11 and the right camera 12 of the stereo camera 10. In other words, it is possible to reduce the erroneous determination.

The "left camera 11" and the "right camera 12" of the embodiment are one example of the "two cameras, which constitute the stereo camera" of the present invention. The "left image" and the "right image" of the embodiment are respectively one example of the "first image" and the "second image" of the present invention.

The process in the step S204 of the flowchart illustrated in FIG. 9 may be performed before or in parallel with the process in the step S203.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An object recognizing apparatus, which is mounted in a vehicle, comprising:
   a stereo camera, the stereo camera including two cameras, each of which photographs an exterior of a vehicle from a vehicle interior of the vehicle through an area of a window glass wiped by a wiper;
   a light source detector configured to detect a light source on a photographed image photographed by at least one of the two cameras;
   an edge detector configured to detect an edge extending in a direction crossing a wiping direction of the wiper, on the photographed image photographed by at least one of the two cameras;
   a determinator configured to determine that the window glass is stained, if the edge extending in the crossing direction from the light source is detected continuously for a predetermined time, based on the light source detected by the light source detector and the edge detected by the edge detector; and
   a display configured to display a notification that the window glass is stained, based on a detection result of the determinator.

2. The object recognizing apparatus according to claim 1, wherein said determinator is configured to determine that the window glass is stained, if:

the edge extending in the direction crossing the wiping direction of the wiper on a first image, which is the photographed image photographed by at least one of the two cameras, from the light source on the first image is detected continuously for the predetermined time, and the edge extending in the direction crossing the wiping direction of the wiper on a second image, which is a photographed image photographed by the other camera of the two cameras at the same time as the first image, from the light source on the second image is detected continuously for the predetermined time, based on the light source detected b the light source detector and the edge detected by the edge detector.

3. A stain detecting method implemented with an object recognizing apparatus, which is mounted in a vehicle, comprising:

capturing photographed images with a stereo camera, the stereo camera including two cameras, each of which photographs an exterior of a vehicle from a vehicle interior of the vehicle through an area of a window glass wiped by a wiper;

detecting a light source on a photographed image photographed by at least one of the two cameras;

detecting an edge extending in a direction crossing a wiping direction of the wiper, on the photographed image photographed by at least one of the two cameras;

determining that the window glass is stained, as a result of the edge extending in the crossing direction from the light source being detected continuously for a predetermined time, based on the light source detected in the detecting a light source step and the edge detected in the detecting an edge step; and displaying a notification, on a display, that the window glass is stained, based on a detection result of the determining that the window glass is stained step.

4. An object recognizing apparatus, which is mounted in a vehicle, comprising:

a stereo camera, the stereo camera including two cameras, each of which photographs an exterior of a vehicle from a vehicle interior of the vehicle through an area of a window glass wiped by a wiper;

a light source detector configured to detect a light source on a photographed image photographed by at least one of the two cameras;

an edge detector configured to detect an edge extending in a direction crossing a wiping direction of the wiper, on the photographed image photographed by at least one of the two cameras;

a determinator configured to determine that the window glass is stained, if the edge extending in the crossing direction from the light source is detected continuously for a predetermined time, based on the light source detected by the light source detector and the edge detected by the edge detector, wherein the object recognizing apparatus is configured to operate a window glass wiper when the determinator determines that the window glass is stained.

5. The object recognizing apparatus according to claim 4, wherein said determinator is configured to determine that the window glass is stained, if:

the edge extending in the direction crossing the wiping direction of the wiper on a first image, which is the photographed image photographed by at least one of the two cameras, from the light source on the first image is detected continuously for the predetermined time, and the edge extending in the direction crossing the wiping direction of the wiper on a second image, which is a photographed image photographed by the other camera of the two cameras at the same time as the first image, from the light source on the second image is detected continuously for the predetermined time, based on the light source detected by the light source detector and the edge detected by the edge detector.

\* \* \* \* \*